No. 630,595. Patented Aug. 8, 1899.
H. W. CONNER.
COMBINED COOKING STOVE AND HEATER.
(Application filed Mar. 22, 1899.)
(No Model.) 2 Sheets—Sheet 1.
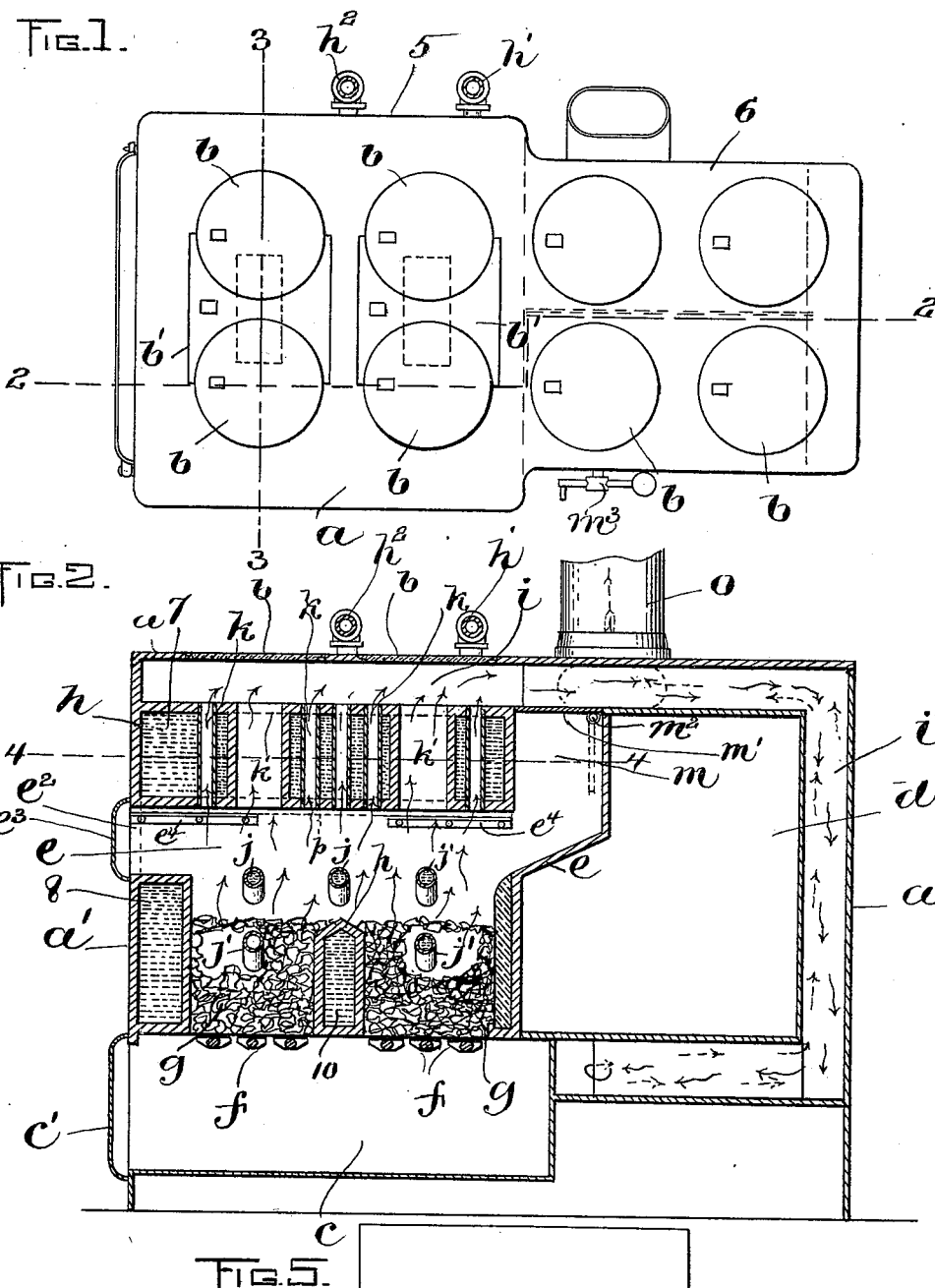
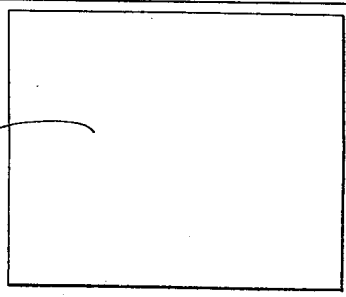
WITNESSES.
A. D. Harrison
P. W. Pezzetti
INVENTOR
H. W. Conner
by Wright, Brown & Quinby
Attys.

No. 630,595. Patented Aug. 8, 1899.
H. W. CONNER.
COMBINED COOKING STOVE AND HEATER.
(Application filed Mar. 22, 1899.)
(No Model.) 2 Sheets—Sheet 2.
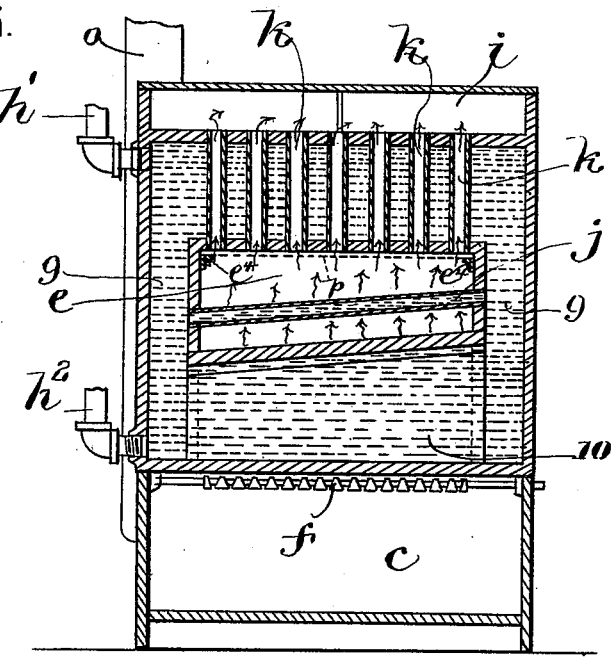
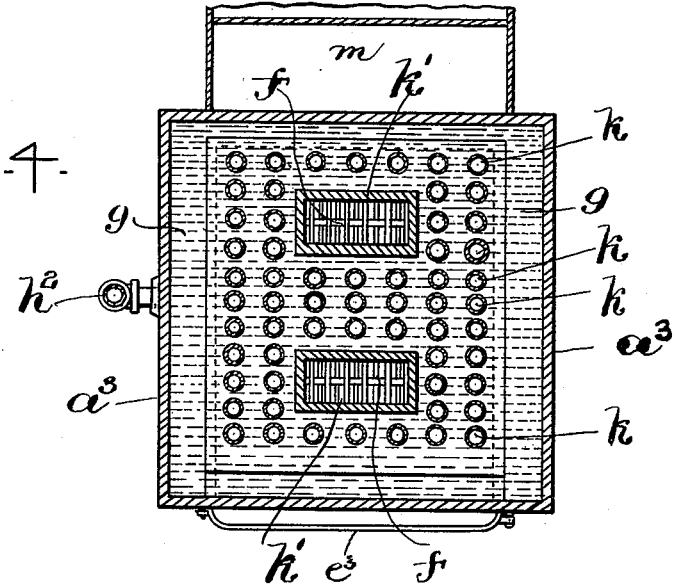
WITNESSES:
A. D. Harrison
P. W. Pezzetti
INVENTOR
H. W. Conner
by Wright, Brown & Quinby
Attys.

UNITED STATES PATENT OFFICE.

HARRISON W. CONNER, OF BOSTON, MASSACHUSETTS.

COMBINED COOKING-STOVE AND HEATER.

SPECIFICATION forming part of Letters Patent No. 630,595, dated August 8, 1899.

Application filed March 22, 1899. Serial No. 710,079. (No model.)

*To all whom it may concern:*

Be it known that I, HARRISON W. CONNER, of Boston, in the county of Suffolk and State of Massachusetts, have invented certain new and useful Improvements in a Combined Cooking-Stove and Heater, of which the following is a specification.

This invention relates to combined cooking-stoves and water-heaters or those designed to furnish facilities for cooking and also for heating a water-supply to be circulated through a dwelling, whereby the duties ordinarily performed by separate apparatus are combined and performed by one device.

The invention consists in the improvements which I shall now proceed to describe and claim.

Of the accompanying drawings, Figure 1 represents a top plan view of a combined cooking-stove and heater constructed in accordance with my invention. Fig. 2 represents a vertical sectional view thereof on the line 2 2 of Fig. 1. Fig. 3 represents a section on the line 3 3 of Fig. 1. Fig. 4 represents a section on the line 4 4 of Fig. 2. Fig. 5 represents a top plan view of a diaphragm employed.

The same reference characters indicate the same parts in all the figures.

Referring to the drawings, $a$ designates the top of the stove or the flat surface for supporting the cooking utensils, the same having the ordinary pot holes or apertures covered by the round lids $b\ b$ and the center lids $b'\ b'$, there being, as here shown, two parts to the stove-top—a front part 5 and a rear part 6—upon either or both of which the cooking utensils may be supported.

$a'$, $a^2$, and $a^3$ are the front, back, and sides of the outer casing or shell of the stove.

$c$ is the ash-pit, provided with a door $c'$, and $d$ is the oven, situated at the back of the stove.

$e$ is the fire-chamber, at the bottom of which are two separate grates $f\ f$ for supporting two bodies of fuel $g\ g$. The fire-chamber is separated from the oven by a partition $e'$, which permits the conduction of heat to said oven.

Surrounding the fire-chamber $e$ on the top, front, and ends is a water-chamber $h$, the top portion 7 of which is separated from the top $a$ of the stove by a horizontal passage $i$ for the hot gases or products of combustion, and the front portion 8 of which is traversed by an opening $e^2$, extending from the fire-chamber $e$ to the front of the stove and having a door $e^3$. The end portions 9 9 of the water-chamber, which extend vertically along the ends of the fire-chamber, between its end walls and the outer shell of the stove, are connected by a series of substantially horizontal water-tubes $j\ j$, placed at or near the level of the opening $e^2$ in the front of the stove, there being here shown also a second series or row of similar tubes $j'\ j'$, located below the tubes $j\ j$. It will be seen also that the water-chamber $h$ has a portion 10 extending between the grates $f\ f$, so as to divide the lower part of the fire-chamber $e$ into two separate and distinct receptacles for fuel, the said portion 10 constituting a hollow water-filled partition, which terminates short of the roof of the fire-chamber $e$, preferably at about the level shown in the drawings.

A series of vertical tubular flues or passages $k\ k'$ connects the fire-chamber $e$ with the space $i$ above the water-chamber $h$, the smaller flues $k$ being cylindrical in form, while the larger ones, $k'$, which are shown as two in number, are rectangular in form and located below the apertures in the front portion 5 of the stove-top, which are covered by the lids $b$ and center lids $b'$. The said larger flues $k'$ therefore permit the introduction of fuel into the fire-chamber $e$.

At the rear of the water-chamber $h$ is a flue $m$, leading from the fire-chamber $e$ to the space $i$, which extends over the water-chamber and the oven, said flue not being ordinarily utilized except when the flues $k\ k'$ are in disuse, as hereinafter explained. A valve or damper $m'$, pivoted or hinged at $m^2$ and operated from the outside by means of a weighted handle $m^3$, normally closes said flue.

The operation of my improved stove is as follows: In cold weather when a hot-water supply is desired for heating the dwelling in which the stove is placed the water-chamber $h$ is filled with water, and being connected with the system of pipes in the house by means of the outlet and return pipes $h'\ h^2$ the heating of the water in the stove by the combustion of the fuel on the grates $ff$ causes its circulation through the water-chamber and through the system of piping in the dwelling. When the stove is thus operated, deep beds of fuel are maintained over the grates $ff$, and the products of combustion pass from the fire-chamber $e$ up through the flues $k\,k'$, around the oven $d$, through a space or flue $i'$, and out through the stovepipe or uptake $o$, as indicated by the arrows in Fig. 2. The water circulates through the various portions of the water-chamber $h$, hereinbefore described, and owing to the large heating-surface is quickly and thoroughly heated. An amply sufficient excess of heat then exists to be utilized in cooking both on the top of the stove and in the oven $d$. It will be noted that the opening $e^2$, besides being adapted for the introduction of fuel, also serves for broiling or toasting, and the tubes $j$ provide a convenient, efficient, and novel support for conducting such operations. In summer, or when it is not desired to employ the stove as a water-heater, but merely for cooking, I make provisions for shutting off the heat of the fire-chamber from the main portion of the water-chamber and directing it principally to the rear part of the stove through the flue $m$. To this end the ends of the fire-chamber $e$ are provided with guides $e^4\,e^4$, which are adapted to support a flat diaphragm $p$, (shown in Fig. 5 and in dotted lines in Fig. 2,) which diaphragm when inserted in the stove is located immediately below the lower ends of the flues $k\,k'$, so as to form a roof for the fire-chamber $e$. This diaphragm $p$ may be inserted and removed through the opening or doorway $e^2$ in the front of the stove, and when in position it serves to cut off the flues $k\,k'$ as a passage for the gases, the gases being then directed through the flue $m$ by opening the valve $m'$ to the position represented in dotted lines in Fig. 2. When the stove is arranged in this manner, the water-chamber $h$ is not heated to any considerable extent and the depth of the fuel-beds on the grates $ff$ may be reduced to a considerable extent, the back part 6 of the stove-top being then the hottest part, and the cooking being preferably performed on this part, while the front part 5 may be used for warming purposes. The diaphragm $p$ may at any time be easily removed, and the stove thereby restored to its function as a heater. When the heater portion of the stove is in whole or partial disuse, it is preferable to employ only one of the grates $f$—that nearest the oven—and to use one fuel-bed only, thus economizing in fuel.

I do not confine myself to the exact details of construction and arrangement herein set forth, as the same may be considerably varied without departing from the spirit of my invention.

I claim—

1. A stove having a top or support for cooking utensils, provided with apertures and lids, a water-chamber below said top and separated therefrom by a horizontal space for the passage of products of combustion, a fire-chamber below said water-chamber, a series of narrow vertical flues $k\,k$ connecting said fire-chamber with the space above the water-chamber and acting as passages for the products of combustion, and one or more wide flues $k'$ connecting said fire-chamber and space and located beneath the lids, said wide flues acting as passages for the products of combustion and also as holes for the introduction of fuel to the fire-chamber, as set forth.

2. A stove having a top or support for cooking utensils, provided with apertures and lids, a fire-chamber, two horizontal grates located side by side at the bottom of said fire-chamber, a water-chamber surrounding said fire-chamber on the ends and top and separated from the stove-top by a space for the passage of products of combustion, said water-chamber having a portion 10 connecting its end portions and located between the two grates, so as to act as a hollow partition between the two bodies of fuel thereon, through which the water in the chamber circulates, said portion 10 terminating on its upper edge short of the roof of the fire-chamber, and one or more flues connecting the fire-chamber with the space between the stove-top and water-chamber.

3. A stove having a top or support for cooking utensils provided with apertures and lids, a water-chamber below said top and separated therefrom by a space for the passage of products of combustion, an uptake $o$ communicating with said space, a fire-chamber below the water-chamber, a series of flues $k\,k'$ connecting the fire-chamber with said space, a diaphragm $p$, supporting means $e^4$ for supporting said diaphragm below the lower ends of the flues $k\,k'$, so as to shut off said flues, an opening $e^2$ in the wall of the stove for introducing and removing said diaphragm, a flue $m$ connecting the fire-chamber independently with the uptake $o$, and a valve or damper in said flue for opening or closing the same.

4. A stove having a top or support for cooking utensils, provided with apertures and lids, a fire-chamber, a water-chamber surrounding said fire-chamber on the top and ends and separated from the stove-top by a space for the passage of gases, one or more flues connecting said space with the fire-chamber, water-tubes connecting the end portions of said water-chamber and traversing the fire-chamber, and inlet and outlet pipes connecting with said water-chamber.

5. A stove having a top or support for cooking utensils, provided with apertures and lids, a fire-chamber, a water-chamber surrounding said fire-chamber on the top and ends and separated from the stove-top by a space for the passage of gases, one or more flues connecting said space with the fire-chamber, a series of water-tubes connecting the end portions of said water-chamber and crossing the fire-chamber substantially in a horizontal direction, and a door in the front wall of the stove substantially at the level of the said tubes.

In testimony whereof I have affixed my signature in presence of two witnesses.

HARRISON W. CONNER.

Witnesses:
R. M. PIERSON,
PETER W. PEZZETTI.